US009563456B2

(12) United States Patent
Tsirkin (10) Patent No.: US 9,563,456 B2
(45) Date of Patent: *Feb. 7, 2017

(54) FEATURE DRIVEN BACKEND SWITCHING (71) Applicant: Red Hat Israel, Ltd., Raanana (IL)

(72) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 495 days.

This patent is subject to a terminal disclaimer.

(21) Appl. No.: 13/973,969

(22) Filed: Aug. 22, 2013

(65) Prior Publication Data

US 2013/0339954 A1    Dec. 19, 2013

Related U.S. Application Data (63) Continuation of application No. 13/012,042, filed on Jan. 24, 2011, now Pat. No. 8,522,238.

(51) Int. Cl.
*G06F 9/455* (2006.01)
(52) U.S. Cl.
CPC . *G06F 9/45558* (2013.01); *G06F 2009/45579* (2013.01)
(58) Field of Classification Search
None
See application file for complete search history.

(56) References Cited

U.S. PATENT DOCUMENTS

| | | | |
|---|---|---|---|
| 7,237,016 B1 | 6/2007 | Schober | |
| 7,370,324 B2 | 5/2008 | Goud et al. | |
| 7,421,533 B2 | 9/2008 | Zimmer et al. | |
| 8,028,184 B2 | 9/2011 | Sekiguchi et al. | |
| 8,196,144 B2 | 6/2012 | Kagan et al. | |
| 2006/0294519 A1 | 12/2006 | Hattori et al. | |
| 2007/0300223 A1 | 12/2007 | Liu | |
| 2009/0119087 A1 | 5/2009 | Ang et al. | |
| 2010/0064301 A1* | 3/2010 | Suzuki | G06F 9/45533 719/324 |
| 2012/0110181 A1 | 5/2012 | Tsirkin | |
| 2012/0158887 A1 | 6/2012 | Tsirkin | |
| 2012/0159473 A1 | 6/2012 | Tsirkin | |

OTHER PUBLICATIONS

USPTO Office Action for U.S. Appl. No. 13/012,042, mailed Jan. 15, 2013.
USPTO Notice of Allowance for U.S. Appl. No. 13/012,042, mailed Jan. 15, 2013.

* cited by examiner

*Primary Examiner* — Van Nguyen
(74) *Attorney, Agent, or Firm* — Lowenstein Sandler LLP (57) ABSTRACT A method and system for switching backend devices in a virtual machine system based on features of the backend devices. In one embodiment, a computer system includes at least a first device and a second device that function as a backend device. The first device is currently used by a guest of the computer system as the backend device. A hypervisor of the computer system receives an indication from the guest to use a feature of the backend device. The hypervisor determines whether the use of the feature of the backend device triggers a switching condition. In response to a determination that the switching condition is triggered, the guest is switched to use the second device as the backend device. The switching operation can be transparent to the guest.

20 Claims, 5 Drawing Sheets

FIG. 2

NIC CONFIGURATION TABLE 310

| DEVICE ID 210 | FEATURE 220 | SWITCHING CONDITION 230 | FLAG 235 |
|---|---|---|---|
| NIC1 | HIGH SPEED/NO ADDRESS CHANGE | ADDRESS CHANGE | x |
| NIC2 | ALLOW ADDRESS CHANGE | ... | |

GRAPHICS CARD CONFIGURATION TABLE 320

| DEVICE ID 210 | FEATURE 220 | SWITCHING CONDITION 230 | FLAG 235 |
|---|---|---|---|
| GC1 | HIGH RESOLUTION | POWER SAVINGS MODE | |
| GC2 | LOW POWER | HIGH RESOLUTION OPERATION | x |

DISK CONFIGURATION TABLE 330

| DEVICE ID 210 | FEATURE 220 | SWITCHING CONDITION 230 | FLAG 235 |
|---|---|---|---|
| DISK1 | READ ONLY | WRITE REQUEST | x |
| DISK2 | READ AND WRITE | ... | |

SOUND CARD CONFIGURATION TABLE 340

| DEVICE ID 210 | FEATURE 220 | SWITCHING CONDITION 230 | FLAG 235 |
|---|---|---|---|
| SC1 | SURROUND SOUND | SURROUND DISABLED | |
| SC2 | NO SURROUND SOUND | SURROUND ENABLED | x |

FEATURE DRIVEN BACKEND SWITCHING

RELATED APPLICATION

This application is a continuation of U.S. patent application Ser. No. 13/012,042, filed on Jan. 24, 2011, now U.S. Pat. No. 8,522,238, issued on Aug. 27, 2013, the entirety of which is incorporated herein by reference.

TECHNICAL FIELD

Embodiments of the present invention relate to a computer system, and more specifically, to device management in a virtual machine system.

BACKGROUND

Virtualization allows multiplexing of an underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

A virtual machine system generally includes multiple backend devices. A backend device is a communication end point with which guest software on a virtual machine interacts. Examples of a backend device include network interface cards (NICs), disks, graphics cards, sound cards, video cards, modems, bridges, etc.

A virtual machine system can include more than one of the same kinds of a backend device. For example, a virtual machine system can include multiple NIC cards that have different features (e.g., different power consumption, speed, costs, number of concurrent users allowed). One of the NIC cards allows the guest to change its media access control (MAC) address and the others do not. During operation, the guest may need to change its MAC address but the NIC card it is currently using does not allow MAC address change. One current approach is to rely on a system administrator to command the hypervisor to initiate backend device switching for the guest. For example, a system administrator can hotplug remove a currently-installed backend device and hotplug add a new backend device. However, relying on a system administrator to detect the guest's needs and to issue appropriate commands can be cumbersome and inefficient. Further, hotplug operations are not transparent to the guest.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system that uses a feature driven mechanism for switching backend devices in a virtual machine system. In one embodiment, a computer system includes at least a first device and a second device that function as a backend device. The first device is currently used by a guest of the computer system as the backend device. A hypervisor of the computer system receives an indication from the guest to use a feature of the backend device. The hypervisor determines whether the use of the feature of the backend device triggers a switching condition. In response to a determination that the switching condition is triggered, the guest is switched to use the second device as the backend device. The switching operation can be transparent to the guest.

Throughout the following description, the term "backend device" is used to refer to a hardware device or a software device. Such devices include backend interface cards (NICs), disks, graphics cards, sound cards, video cards, modems, bridges, etc. It is understood that other network devices may be included. The term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
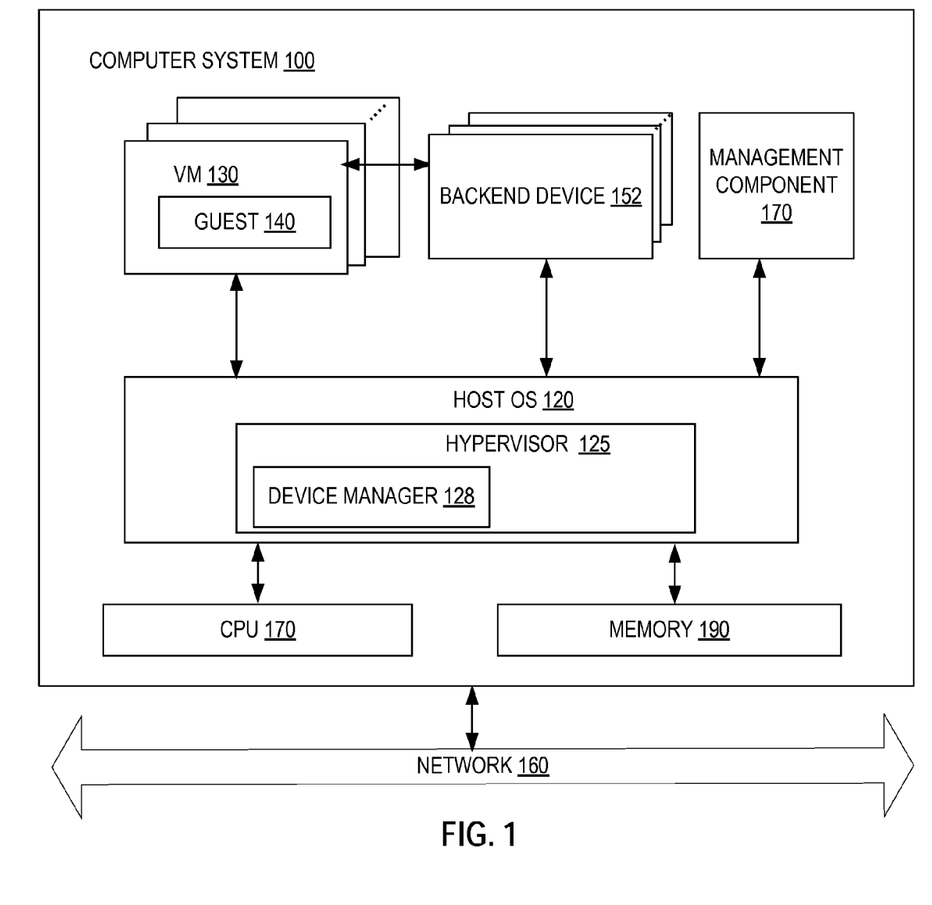
FIG. 1 is a block diagram of a virtual machine system that hosts a guest.

FIG. 1 is a block diagram that illustrates an embodiment of a computer system 100 in which embodiments of the present invention may operate. The computer system 100 hosts a plurality of virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a hypervisor 125 to virtualize access to the underlying host hardware, making the use of the virtual machine 130 transparent to the guest 140 and the users of the computer system 100. In one embodiment, the hypervisor 125 may support multiple virtual machines 130. In one embodiment, the hypervisor 125 is part of a host OS 120.

In one embodiment, the computer system 100 is accessible by remote systems via a network 160. The network 160 may be a private network (e.g., a local area network (LAN), a wide area network (WAN), intranet, etc.) or a public network (e.g., the Internet).

The computer system 100 also includes hardware components such as one or more physical central processing units (CPUs) 170, memory 190, and other hardware components.

In one embodiment, the computer system 100 also includes one or more backend devices communicatively coupled to the guest 140. The computer system 100 may include more than one backend device of the same device type; e.g., the computer system 100 may include two or more NICs that can be used by multiple guests. During operation, each guest 140 may not see all of the backend devices of the same device type in the computer system 100. Rather, each guest 140 may see a subset (e.g., one, two, or a configurable number) of the backend devices of the same device type. In other words, only a subset of the backend devices of the same device type is exposed to the guest 140. For simplicity of the discussion, the guest 140 in the following description is exposed to one backend device of the same device type (e.g., one NIC, one sound card, etc.) at a time. It is understood that the guest in alternative embodiments may be exposed to multiple backend devices of the same device type at the same time.

According to one embodiment of the present invention, the hypervisor 125 includes a device manager 128 to manage the backend devices 152 used by the guest 140. When the guest 140 attempts to use a certain feature of a backend device 152, the hypervisor 125 will trap the attempt and determine whether the guest 140 should switch to a different device that supports the feature. The computer system 100 includes multiple backend devices of the same device type with different features. For example, the computer system 100 may include two network devices with different speeds and/or different processing capabilities. When the guest 140 attempts to use a certain capability of a network device not provided by the network device currently accessible by the guest 140, the guest 140 can be switched to a different network device that provides the required capability.

In one embodiment, the decision to switch is based on whether the use of the feature triggers a pre-defined switching condition. The switching condition, in turn, is defined based on whether the current device used by the guest 140 as the backend device supports the feature, whether another device that also functions as the backend device supports the feature better than the current device, or other considerations. In some embodiments, the guest 140 may send a signal to the hypervisor 125 indicating the intent to use the feature before performing an operation that uses the feature (e.g., when the guest 140 uses a feature supported by a peripheral component interconnect (PCI) device). In some other embodiments, the guest 140 may directly attempt to perform an operation that uses the feature.

To allow speedy switching operations, in one embodiment, the devices to which the guest 140 can switch are open (that is, activated or made accessible) for access by the guest 140 before the switching operation takes place. In alternative embodiments where the devices are not pre-open for guest access, the device that the guest 140 switches to can be open when the switching takes place. In one embodiment, the computer system 100 includes a management component 170 that controls the accessibility of the backend devices 152. Before a switching operation occurs, the management component 170 may open multiple devices of the same device type that support the features that the guest 140 may need to use. Thus, during operations of the guest 140, the guest 140 can seamlessly switch among these open devices. In one embodiment, the management component 170 may be part of the computer system 100 or part of the hypervisor 125. In an alternative embodiment, the management component 170 may be separate from the computer system 100 but communicatively coupled to the computer system 100 (e.g., the management component 170 may reside in another computer system).

Figure 2:
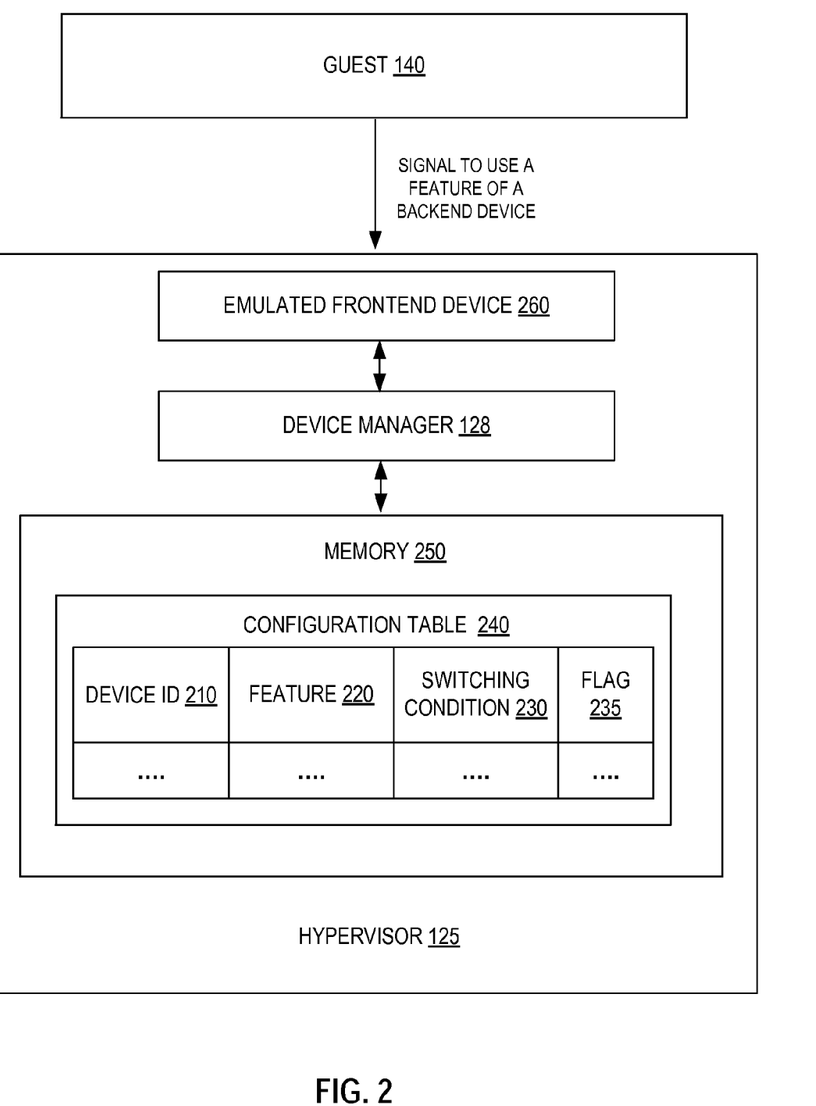
FIG. 2 is a block diagram of a hypervisor and a guest in a virtual machine system.

FIG. 2 is a block diagram that illustrates an example of the guest 140 and the hypervisor 125. In one embodiment, the hypervisor 125 maintains and updates a configuration data structure (e.g., a configuration table 240) in memory 250 for each backend device in the computer system 100 (FIG. 1). In one embodiment, the configuration table 240 for a backend device includes identifiers 210 for identifying the devices of the same device type that function as a backend device, features 220 for each device, and one or more switching conditions 230 that specify when device switching should occur. The configuration table 340 may also include an indicator (e.g., a flag 235), indicating the device that is currently used by the guest 140 as a backend device. Using the configuration table 240, the device manager 128 is able to keep track of the features of each device in the computer system 100, the devices that are currently used by the guest 140, and make decisions on whether to trigger a switch of the devices for the guest 140.

In one embodiment, the hypervisor 125 couples a backend to the guest by exposing an emulated frontend device 260 (e.g., an emulated Peripheral Component Interconnect (PCI) device) to the guest 140. Guest access to the frontend device 260 is trapped by the hypervisor 125 and translated into an access to the backend device. Incoming data and notifications from the backend device is translated by the hypervisor 125 and made appear to the guest 140 as if they were coming to the guest 140 from the frontend device 260.

In one embodiment, a single frontend device is exposed to the guest 140 and is used to couple the guest 140 to one of the multiple backend devices, while the switching between the backend devices is transparent to the guest. In alternative embodiments, the guest 140 may be coupled to a backend device by the hypervisor 125 without the use of a frontend device. For example, the guest 140 can communicate to the backend device without the means of a frontend device in the hypervisor 125 using one of the following approaches: by making a hypercall which is trapped by the hypervisor 125 and forwarded to the backend device, or by having the device memory mapped by the hypervisor 125 directly into the guest memory at an address known to guest 125.

Figure 3:
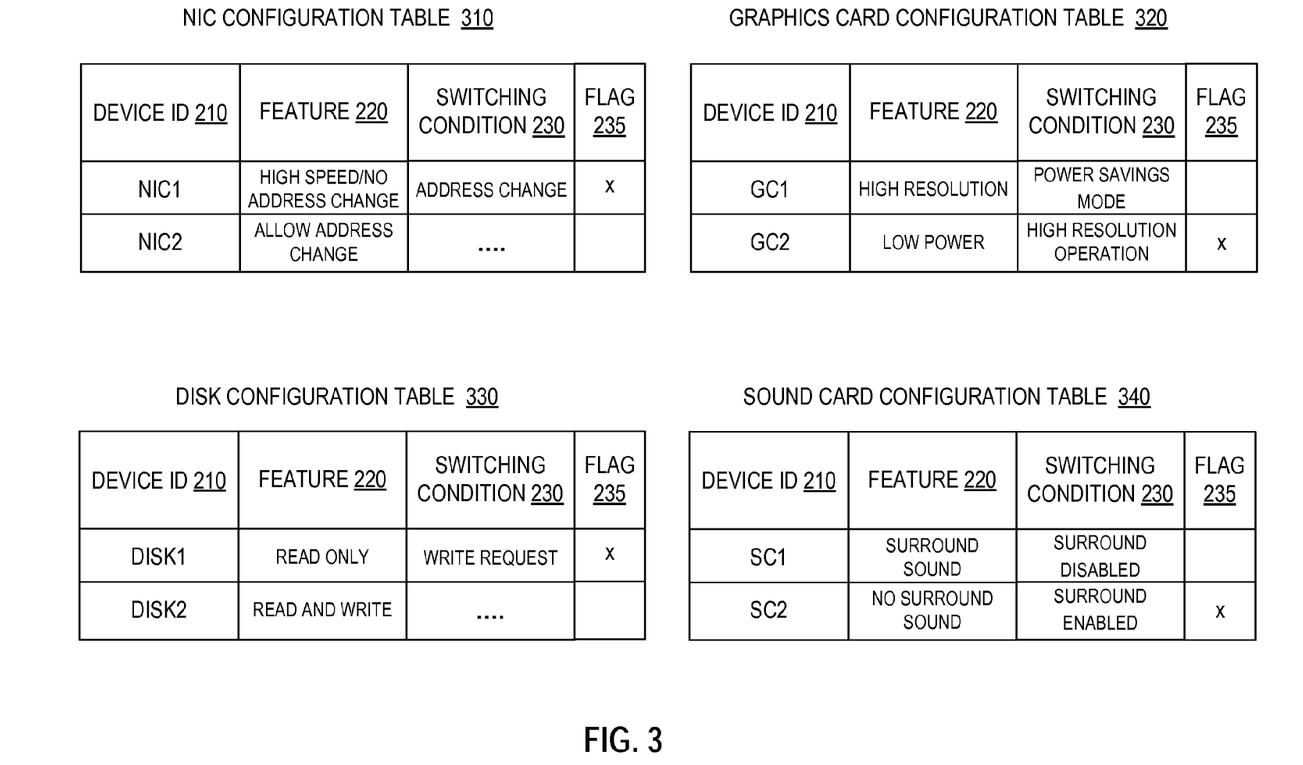
FIG. 3 is a diagram illustrating examples of a configuration data structure.

FIG. 3 illustrates a number of examples of the configuration table 240 of FIG. 2. In one embodiment, devices of the different device types are tracked in different configuration tables. An example is an NIC configuration table 310, which stores the information of two NIC devices (NIC1 and NIC2). NIC1 has high speed and does not allow change of medium access control (MAC) address. NIC2 has lower speed but allows change of MAC address. The NIC configuration table 310 indicates that that NIC1 is currently used by the guest 140 as the backend NIC device. The switching condition 330 for the guest 140 to switch from NIC1 to NIC2 includes when the guest requests or attempts to change its MAC address. Additional switching conditions may be based on additional features of NIC1 and NIC2, such as: the amount of power consumption, costs, number of concurrent users that can be supported, etc. Although two devices are shown in the configuration table 310 (as well as in configuration tables 320-340 described below), it is understood that each of the configuration tables 310-340 may contain any number of devices of the same device type.

Another example is a disk configuration table 320, which stores the information of two disks (DISK1 and DISK2). DISK1 is read-only and DISK2 is both readable and writable. The guest 140 may initially read the read-only data on DISK1. When the guest 140 sends a write request to write data, a switching condition is triggered and the guest 140 will automatically switch to write data to DISK2. Another example is a graphics card configuration table 330, which stores the information of two graphics cards (GC1 and GC2). GC1 has high resolution and uses more power, and GC2 has low resolution and uses less power. The guest 140 may initially use GC1 in high resolution. When the guest 140 enters a power savings mode, a switching condition is triggered and the guest 140 is switched to GC2 to save power. Yet another example is a sound card configuration table 340, which stores the information of two sound cards (SC1 and SC2). SC1 supports surround sound, and SC2 does not support surround sound. The guest 140 can use SC2 when surround sound is disabled. When surround sound is enabled, a switching condition is triggered and the guest 140 is switched to SC1.

Although not shown in FIG. 3, the device manager 128 can manage the backend device usage of other device types. For example, the computer system 100 may include multiple modems, and one or more of them supports fax functionality. If the guest 140 originally uses a modem without the fax functionality and then attempts to perform a fax operation, a pre-defined switching condition may be triggered to switch the guest 140 to a different modem that supports fax functionality. As another example, the computer system 100 may include multiple data storage (e.g., memory, disks, flash drives, etc.). The guest 140 may access one data storage having fast speed for small files and another data storage having slower speed for large files. As yet another example, the computer system 100 may include multiple bridges of different functionalities and different speeds. The guest 140 may initially uses a simple bridge that does not support packet filtering. When the guest 140 attempts to configure the bridge with a packet filtering mechanism, a pre-defined switching condition can be triggered to switch the guest 140 to a more advanced bridge that supports packet filtering.

In one scenario, the device manager 128 may switch the device used by the guest 140 when the feature requested by the guest 140 is not supported by the current device used by the guest and is supported by another device of the same device type. In another scenario, the device manager 128 may switch the device used by the guest 140 when the feature requested by the guest 140 is supported by the current device used by the guest but is better supported (e.g., with better speed, lower power, etc.) by another device of the same device type. The device manager 128 may determine whether to switch for each individual device based on the pre-defined switching conditions. The decision to switch and the switching operation are transparent to the guest 140. From the guest's point of view, only one single device for each device type is exposed to the guest 140 as the backend device of that device type.

Figure 4:
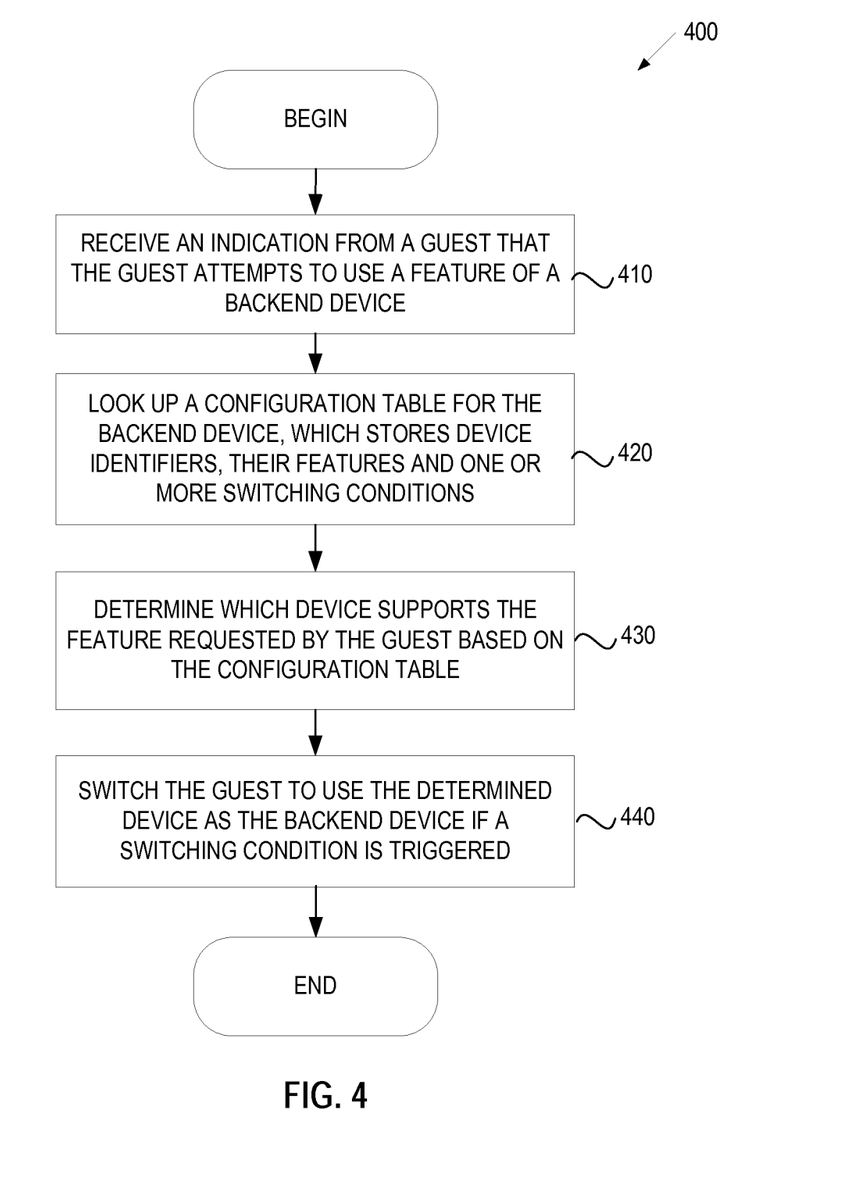
FIG. 4 is a flow diagram of one embodiment of a method for feature driven backend switching.

FIG. 4 is a flow diagram illustrating one embodiment of a method 400 for feature driven backend switching. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the device manager 128 of the hypervisor 125 of FIG. 1 and FIG. 2.

Referring to FIG. 4, in one embodiment, the method 400 begins when the device manager 128 receives an indication that the guest 140 attempts to use a feature of a backend device (block 410). The indication may be implicit in an operation that the guest attempts to perform (e.g., the guest 140 attempts to change its MAC address). In response to the indication, the device manager 128 looks up a configuration table for the backend device (block 420). The configuration table stores a list of identifiers of the devices that function as the backend device, the features of the devices, and one or more switching conditions. Based on the information in the configuration table, the device manager 128 determines which device supports (or best supports) the feature requested by the guest 140 (block 430). In one embodiment, the determination may be made based on the pre-defined switching conditions in the configuration table. The device manager 128 switches the guest 140 if a pre-defined switching condition is triggered (e.g., an attempt to change MAC address) (block 440). As mentioned above, the determination to switch and the switching operation itself are triggered by the guest's operation, but at the same time, can be completely transparent to the guest 140. It is not necessary to involve a system administrator to issue a command to switch the devices used by a guest.

Figure 5:
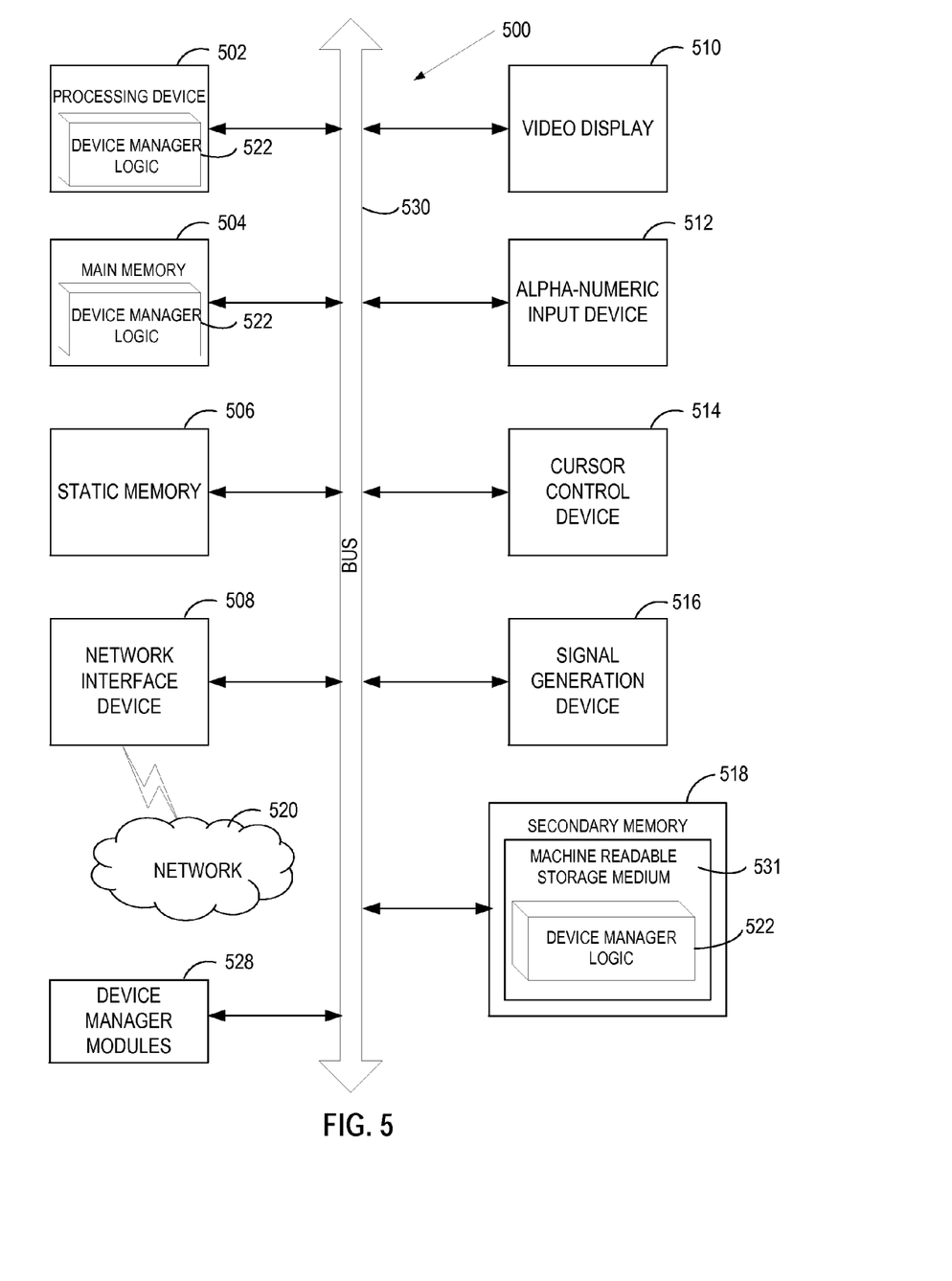
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute device manager logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., device manager logic 522) embodying any one or more of the methodologies or functions described herein (e.g., the device manager 128 of FIGS. 1 and 2). The device manager logic 522 may also reside, completely or at least partially, within the main memory 504 and/or within the processing device 502 during execution thereof by the computer system 500; the main memory 504 and the processing device 502 also constituting machine-readable storage media. The device manager logic 522 may further be transmitted or received over a network 520 via the network interface device 508.

The machine-readable storage medium 531 may also be used to store the device manager logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include device manager modules 528 for implementing the functionalities of the device manager 128 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "switching", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

receiving, by a hypervisor executed by a processing device of a computer system, an indication from a guest to use a feature of a backend device, wherein the guest is currently utilizing a first device as the backend device;

responsive to the indication from the guest to use the feature of the backend device, determining, by the hypervisor, that support of the feature of the backend device is provided by a second device that is not currently utilized by the guest as the backend device; and switching the guest to use the second device as the backend device.

2. The method of claim 1, wherein determining that support of the feature of the backend device is provided by the second device comprises determining that the feature is supported by the second device and not supported by the first device.

3. The method of claim 1, wherein determining that support of the feature of the backend device is provided by the second device comprises determining that the feature is better supported by the second device than by the first device.

4. The method of claim 1, further comprising:

maintaining a configuration data structure for each of a plurality of backend devices used by the guest, each configuration data structure for a corresponding backend device containing identifiers for guest devices that function as the corresponding backend device, features provided by the guest devices, and one or more switching conditions that are defined in view of support of one or more of the features by the corresponding backend device.

5. The method of claim 1, wherein switching the guest is performed transparently to the guest.

6. The method of claim 1, further comprising:

opening, by a management component, both of the first device and second device for access by the guest prior to the switching.

7. The method of claim 1, wherein the backend device comprises a software device or a hardware device.

8. A system comprising:

a memory;

a processor coupled to the memory; and a hypervisor, executed from the memory by the processor, the hypervisor to:

receive an indication from a guest to use a feature of a backend device, wherein the guest is currently utilizing a first device as the backend device;

responsive to the indication from the guest to use the feature of the backend device, determine that support of the feature of the backend device is provided by a second device that is not currently utilized by the guest as the backend device; and switch the guest to use the second device as the backend device.

9. The system of claim 8, wherein the hypervisor is to determine that support of the feature of the backend device is provided by the second device by determining that the feature is supported by the second device and not supported by the first device.

10. The system of claim 8, wherein the hypervisor is to determine that support of the feature of the backend device is provided by the second device by determining that the feature is better supported by the second device than by the first device.

11. The system of claim 8, wherein the memory stores a configuration data structure that contains identifiers for guest devices that function as the backend device, features provided by the guest devices, and one or more switching conditions that are defined in view of support of one or more of the features by the corresponding backend device.

12. The system of claim 8, wherein the hypervisor switches the guest transparently to the guest.

13. The system of claim 8, further comprising:

a management component to open both of the first device and second device for access by the guest prior to the switching.

14. The system of claim 8, wherein the backend device comprises a software device or a hardware device.

15. A non-transitory computer readable storage medium including instructions that, when executed by a processing device of a computer system, cause the processing device to perform operations comprising:

receiving, by a hypervisor, executed by the processing device, an indication from a guest to use a feature of a backend device, wherein the guest is currently utilizing a first device as the backend device;

responsive to the indication from the guest to use the feature of the backend device, determining, by the hypervisor, that support of the feature of the backend device is provided by a second device that is not currently utilized by the guest as the backend device; and switching the guest to use the second device as the backend device.

16. The computer readable storage medium of claim 15, wherein determining that support of the feature of the backend device is provided by the second device comprises determining that the feature is supported by the second device and not supported by the first device.

17. The computer readable storage medium of claim 15, wherein determining that support of the feature of the backend device is provided by the second device comprises determining that the feature is better supported by the second device than by the first device.

18. The computer readable storage medium of claim 15, further comprising:

maintaining a configuration data structure for each of a plurality of backend devices used by the guest, each configuration data structure for a corresponding backend device containing identifiers for guest devices that function as the corresponding backend device, features provided by the guest devices, and one or more switching conditions that are defined in view of support of one or more of the features by the corresponding backend device.

19. The computer readable storage medium of claim 15, wherein switching the guest is performed transparently to the guest.

20. The computer readable storage medium of claim 15, further comprising:

opening, by a management component, both of the first device and second device for access by the guest prior to the switching.

* * * * *